W. O. MILLER.
TRACTOR TRUCK MECHANISM.
APPLICATION FILED MAY 27, 1918.
1,304,347.
Patented May 20, 1919.
2 SHEETS—SHEET 2.
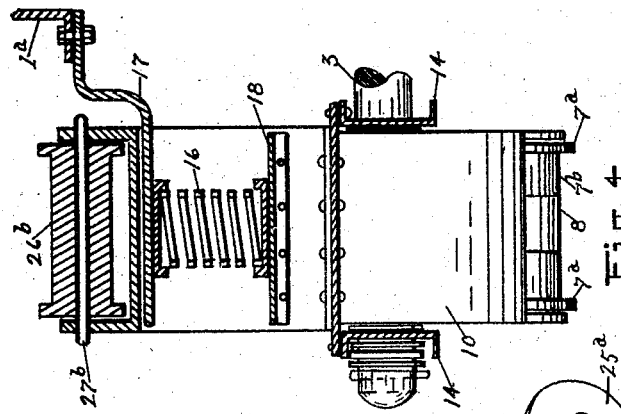
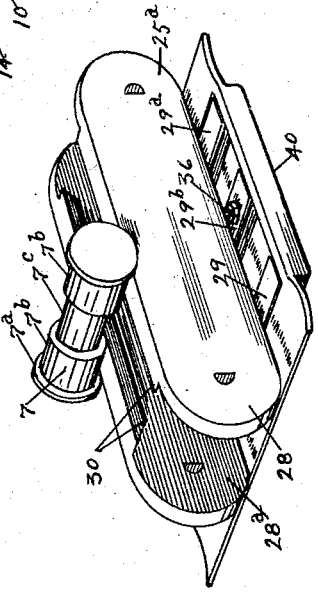
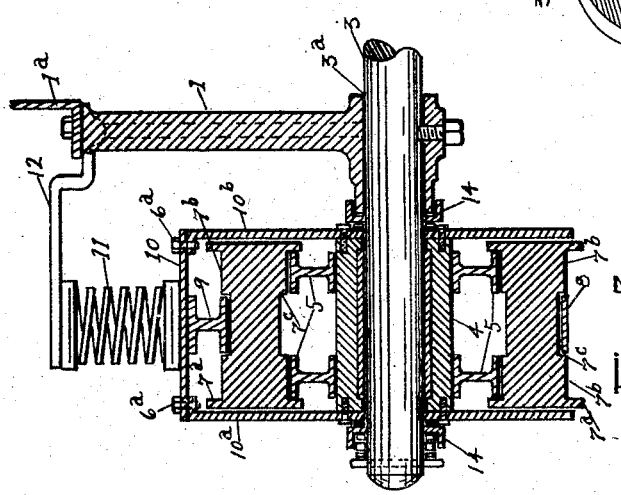
WITNESSES
O. M. Vrooman
Stanley Miller.
INVENTOR
William O. Miller
BY F. C. Bates
HIS ATTORNEY

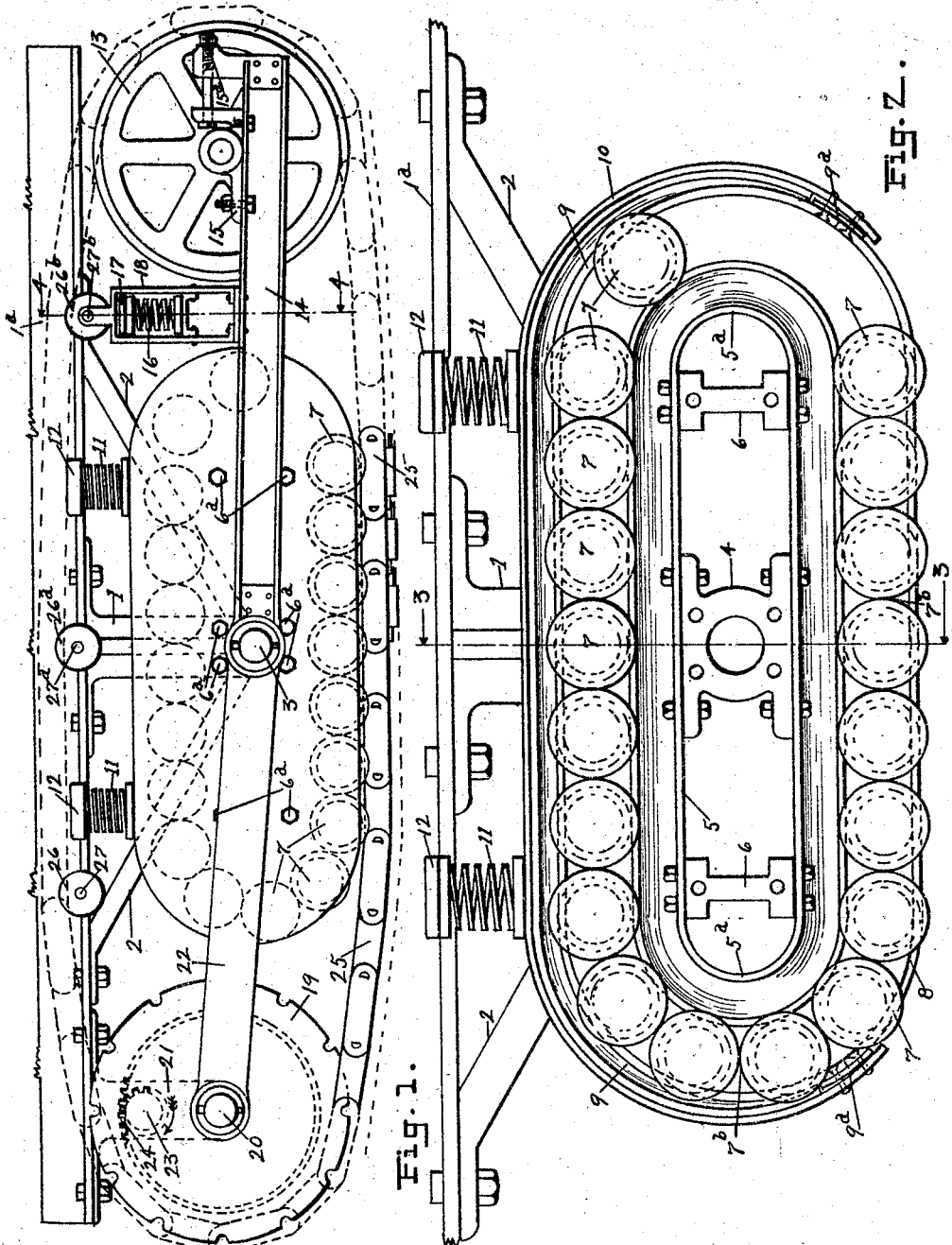

UNITED STATES PATENT OFFICE.

WILLIAM O. MILLER, OF SAN JOSE, CALIFORNIA.

TRACTOR-TRUCK MECHANISM.

1,304,347. Specification of Letters Patent. Patented May 20, 1919.

Application filed May 27, 1918. Serial No. 236,897.

*To all whom it may concern:*

Be it known that I, WILLIAM O. MILLER, a citizen of the United States, residing at San Jose, in the county of Santa Clara and State of California, have invented a new and useful Improvement in Tractor-Truck Mechanism, of which the following is a specification.

This invention relates to improvement in tractor truck mechanism of the track-laying type; and the objects of my invention are:

First: to provide an efficient, compact and economical tractor truck mechanism that will have self-laying track and rollers therefor.

Second: to provide a tractor truck mechanism that will have fewer wearing surfaces and one in which the parts, when worn, can be replaced more readily than those of the class now in use.

Third: to provide a tractor truck mechanism that will readily adapt itself to the uneveness of the ground and thereby obtain the maximum traction on various conditions of ground surface.

Fourth: to provide a tractor truck mechanism that will have flanged rollers traveling on stationary tracks with guide rails therefor, and one in which the flanges on the rollers serve to reduce friction between the rollers.

A further object is to generally improve this class of tractor truck mechanism so as to increase their usefulness, durability, and efficiency. It being understood that various changes in form, proportion and minor details of construction may be resorted to within the scope of the appended claims.

With these and other objects in view, the invention consists in the novel construction and arrangement of parts as hereinafter fully described and pointed out in the claims. Reference is to be had to the accompanying drawings, forming a part of this specification, in which similar reference characters indicate corresponding parts in all the figures.

Figure 1 is a side view of my tractor truck, parts assembled.

Fig. 2 is an enlarged side view of the roller and stationary track mechanism, side plate removed.

Fig. 3 is a sectional view as shown on line 3—3 of Fig. 2.

Fig. 4 is a sectional view as shown on line 4—4 of Fig. 1.

Fig. 5 is a perspective view of a link of the chain track, tread and roller.

My tractor truck mechanism comprises a stanchion or shaft support 1, which may be attached to the frame $1^a$ of a tractor in any suitable manner. Braces are shown at 2 and are for the purpose of holding said stanchion or shaft support 1 more rigidly in place. A shaft or axle is shown at 3, said shaft being securely fastened in the lower end of stanchion or shaft support 1 in opening $3^a$. A bearing 4 is turnably secured to the shaft to which is fastened a plurality of metal tracks 5; having semi-circular connecting members $5^a$ integral therewith; on these tracks is riveted a plurality of metal cross-tie members 6. These tracks form continuous oblong races on which the metal rollers 7 travel, said rollers being held in the races by means of guide rails 8 and 9; the guide rail 9 is securely fastened to the casing 10, surrounding the rollers and races, and the guide rail 8 is fastened to guide rail 9 at $9^a$. The rollers 7 have flanges $7^a$ which keep the rollers in proper position on the tracks or races, and also serve as friction surfaces when the rollers are rubbing against one another as at $7^b$. The annular groove $7^c$ intermediate the ends of the rollers is to allow the guide rail 8 to set in clear of the bearing surfaces $7^b$ of the rollers. Side plates are shown at $10^a$ and $10^b$ fastened to the bearing 4, cross tie members 6, and casing 10, by bolts $6^a$; shock absorbing springs are shown at 11, placed between the casing 10 and brackets 12, said brackets being fastened to the frame $1^a$ in any suitable manner. These springs hold the casing and its mechanism in position, but at the same time allowing the casing and its mechanism to rock back and forth by means of the bearing 4 and shaft 3.

A distance forward of the casing 10 is shown an idler pulley wheel 13 supported on metal arms 14 by means of slidable bearings 15 and adjusting screws $15^a$, said pulley wheel being positioned between these bearings; the metal arms 14 being turnable on shaft 3, allowing the position of the pulley wheel 13 to move through a limited arc independent of the casing 10. This movement is controlled by means of coiled spring 16, positioned between the bracket 17 and the spring support 18. A distance to the rear of the casing 10 is the sprocket wheel 19 journaled on shaft 20, this shaft being attached to the frame 1ª by means of stanchion or shaft support 21 and fastened to the frame 1ª in any suitable manner. A strut rod is shown at 22 and is secured to shaft 3 and shaft 20. This strut rod, in connection with the metal arms 14, hold the shafts 3 and 20 and the idler pulley wheel 13 in proper relation to each other. A power driven pinion is shown at 23 engaging the internal gear 24 of sprocket wheel 19. An endless chain track and tread is shown at 25 and may be of any suitable design, adapted to roll over the rollers 7 and engage the sprocket wheel 19. Guide rollers are shown at 26, 26ª and 26ᵇ. The rollers 26 and 26ª are supported on shafts 27 and 27ª fastened to the frame 1ª in any suitable manner. The guide roller 26ᵇ is supported on shaft 27ᵇ, secured to the spring support 18. These guide rollers guide the endless chain track and tread 25 over the casing 10 to the idler pulley wheel 13, over which it passes and returns to the sprocket wheel 19, passing between the rollers 7 and the ground, thereby laying a track on which the tractor truck mechanism may roll.

The operation of my tractor truck mechanism is as follows:

When the pinion gear 23 is revolved by any suitable power, in the direction indicated by the arrow, the sprocket wheel 19 is caused to revolve; the sprocket, engaging the endless chain tread and track 25 pushes the truck mechanism over the track and rollers 7, thus causing the truck mechanism to roll forward on the chain track 25. The rollers, after rolling along the length of the stationary tracks 5, are forced, one after another, up around the races and are automatically placed in position in front of the stationary tracks 5 ready to again roll between the chain track 25 and stationary tracks 5. The springs 11 and 16 allow the truck mechanism to accommodate itself to the unevenness of the ground over which the tractor trucks would be required to pass.

Having thus described my invention, what I claim as new and desire to secure by Letters Patent is:

1. In a tractor truck mechanism of the class described, comprising a pair of horizontal track members; a second pair of horizontal track members, spaced a distance above and parallel to the first mentioned track members; semi-circular track members connecting the lower track members with the upper track members at each end thereof and integral therewith, thereby forming continuous oblong races; tie members fastened to the track members between the upper and lower tracks; a bearing securely fastened between the upper and lower track members and intermediate the ends thereof; a shaft or axle turnably secured to the bearing; means for fastening the shaft or axle to the frame of a tractor; a plurality of flanged rollers, adapted to roll on said track members, each of said rollers having an annular groove therein intermediate the ends thereof; guide rails adapted to engage said annular groove thereby holding the rollers in position on the tracks; a casing partly inclosing the track members and rollers and to which the guide rails are attached; side plates attached to the bearing and tie members and to the casing, thereby holding the casing and guide rails in position; a plurality of brackets attached to the frame of a tractor; coiled springs positioned between the brackets and the casing, adapted to resiliently hold the casing and track members in a horizontal position; an idler pulley wheel carried a distance forward of the casing and supported on adjustable bearings attached to arms, said arms being turnably attached to the shaft or axle whereby the idler pulley wheel may move through a limited arc independent of the casing and track members, and means for resiliently maintaining said pulley wheel in its normal position; a sprocket wheel turnably secured to the frame of a tractor a distance to the rear of the casing, said sprocket wheel being adapted to engage a flexible chain track; means for securing said sprocket wheel on to the frame, and power operative means for rotating said sprocket wheel, whereby the chain track is caused to travel over the casing, idler pulley wheel and back under the casing to said sprocket wheel; substantially as and for the purpose set forth.

2. In a tractor truck mechanism of the class described, comprising in combination; a pair of horizontal track members; a second pair of horizontal track members spaced a distance above and parallel to the first mentioned track members; track members semi-circular in shape, connecting the lower track members with the upper track members at each end thereof and integral therewith thereby forming continuous oblong tracks or races, adapted to receive rollers therein; tie members fastened to the upper and lower track members; a bearing securely fastened to the upper and lower track members between and intermediate the ends thereof; a shaft or axle, adapted to engage said bearing; means for fastening the shaft or axle to the frame of a tractor; means for holding the bearing on the shaft or axle; a plurality of flanged rollers, each roller having an annular groove therein, intermediate the ends thereof; side plates removably fastened to the bearing and to the tie members; a casing partly surrounding the tracks or races and removably fastened to the side plates; a guide rail, fastened to the casing, said guide rail being formed into shape to conform to the tracks or races and is adapted to engage the annular groove in the rollers thereby holding the rollers in position on the track members; brackets fastened to the frame of a tractor; coiled springs positioned between the brackets and the upper side of the casing at each end thereof, adapted to resiliently limit the turning movement of the casing and its mechanism about the shaft or axle; substantially as and for the purpose set forth.

3. In a tractor truck mechanism of the class described comprising a plurality of track members formed into oblong races; means for fastening the track members in place and to a central bearing; a shaft attached to the frame of a tractor on which said bearing is turnably secured; a plurality of rollers adapted to roll on said tracks; guide rails adapted to hold the rollers in place on the tracks; an idler pulley wheel positioned a distance forward of the track members and supported on arms turnably secured to the shaft; a sprocket wheel turnably secured to the frame of a tractor a distance to the rear of the track members, and power operative means for revolving said sprocket wheel; a chain track, adapted to engage the sprocket wheel, idler pulley wheel and rollers, said chain track having tread members fastened to the lower edges thereof forming widened flat bearing surfaces, adapted to engage the ground thereby forming a chain track, over which the rollers may roll and means for causing the rollers to automatically place themselves in position in front of the track members and on the chain track substantially as and for the purpose set forth.

4. In a tractor truck mechanism of the class described, in combination, a plurality of track members formed into oblong races and being turnably secured to the frame of a tractor, allowing the track members to rock through a limited arc; a plurality of rollers having flanges on each end, and an annular groove intermediate the ends thereof; a guide rail, adapted to engage the annular groove in the rollers; means for securing said guide rail in place; an idler pulley wheel a distance forward of the track members, supported on arms pivoted to the track members; a power driven sprocket wheel a distance to the rear of the track members turnably secured to the frame of a tractor; power operative means for revolving said sprocket; a flexible chain track, adapted to engage the sprocket wheel, idler pulley wheel and rollers, said chain track having tread members fastened to the lower edge thereof forming widened, flat bearing surfaces, adapted to engage the ground thereby forming a chain track over which the rollers may roll; means for causing the rollers to automatically place themselves in position in front of the track members and on the chain track, substantially as and for the purpose set forth.

In testimony whereof, I affix my signature in the presence of two subscribing witnesses, this 22 day of May 1918.

WILLIAM O. MILLER.

Witnesses:
 GEO. B. WHITNEY,
 O. M. VROOMAN.